United States Patent
Tadakuma (10) Patent No.: US 7,536,074 B2
(45) Date of Patent: May 19, 2009

(54) OPTICAL FIBER

(75) Inventor: Masateru Tadakuma, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/197,596

(22) Filed: Aug. 25, 2008

(65) Prior Publication Data
US 2009/0060433 A1 Mar. 5, 2009

(30) Foreign Application Priority Data
Sep. 3, 2007 (JP) .............................. 2007-227630

(51) Int. Cl.
G02B 6/44 (2006.01)
G02B 6/04 (2006.01)
G02B 6/02 (2006.01)

(52) U.S. Cl. ...................... 385/123; 385/100; 385/115; 65/385

(58) Field of Classification Search ................. 385/100, 385/115, 123; 65/385
See application file for complete search history.

(56) References Cited

U.S. PATENT DOCUMENTS

| 6,671,444 | B1 | 12/2003 | Arai et al. |
| 6,766,087 | B2 | 7/2004 | Hiroishi et al. |
| 6,804,441 | B2 | 10/2004 | Arai et al. |
| 7,006,742 | B2 | 2/2006 | Takahashi et al. |
| 7,085,464 | B2 | 8/2006 | Miyabe et al. |
| 7,113,326 | B2 | 9/2006 | Takahashi et al. |
| 7,164,830 | B2 | 1/2007 | Hiroishi et al. |
| 7,248,399 | B2 | 7/2007 | Taniguchi et al. |
| 7,440,167 | B2 | 10/2008 | Taniguchi et al. |

FOREIGN PATENT DOCUMENTS

| JP | 2584151 | 11/1996 |
| JP | 2753426 | 2/1998 |
| JP | 3580640 | 7/2004 |

OTHER PUBLICATIONS

U.S. Appl. No. 12/196,429, filed Aug. 22, 2008, Koyamada et al.
U.S. Appl. No. 12/168,374, filed Jul. 7, 2008, Tadakuma et al.
U.S. Appl. No. 12/195,839, filed Aug. 21, 2008, Taniguchi et al.
U.S. Appl. No. 12/197,596, filed Aug. 25, 2008, Tadakuma.
U.S. Appl. No. 12/203,796, filed Sep. 3, 2008, Takahashi et al.

Primary Examiner—Frank G Font
Assistant Examiner—Erin D Chiem
(74) Attorney, Agent, or Firm—Oblon, Spivak, McClelland, Maier & Neustadt, P.C.

(57) ABSTRACT

An optical fiber made of silica-based material includes a core and a cladding formed around the core. The core is doped with germanium dioxide, which increases refractive index and decreases acoustic-wave velocity, and aluminum oxide, which increases both refractive index and acoustic-wave velocity, satisfying—$2.814+0.594 \times W_1 \leq W_2 \leq 54.100 + 0.218 \times W_1$, $W_1 + W_2 \leq 60$, and $W_2 \geq 56.63 - 2.04 \times W_1$, where $W_1$ is doping amount of germanium dioxide in weight percentage, which is larger than 4.74, and $W_2$ is doping amount of aluminum oxide in weight percentage. A nonlinear coefficient of the optical fiber is equal to or larger than $2.6 \times 10^{-9} W^{-1}$.

3 Claims, 5 Drawing Sheets

(↑; INCREASE  ↓; DECREASE)

| DOPANT | REFRACTIVE INDEX | ACOUSTIC INDEX | ACOUSTIC-WAVE VELOCITY |
|---|---|---|---|
| $TiO_2$ | ↑ | ↑ | ↓ |
| $Al_2O_3$ | ↑ | ↓ | ↑ |
| $GeO_2$ | ↑ | ↑ | ↓ |
| $P_2O_5$ | ↑ | ↑ | ↓ |
| $B_2O_3$ | ↓ | ↑ | ↓ |
| $F_2$ | ↓ | ↑ | ↓ |

FIG.6

| LENGTH [km] | LOSS [dB/km] | $GeO_2$ CONCENTRATION [wt%] | $Al_2O_3$ CONCENTRATION [wt%] | CORE DIAMETER [μm] | Δ1 [%] | Δ2 [%] | BRILLOUIN FREQUENCY SHIFT [GHz] |
|---|---|---|---|---|---|---|---|
| 0.82 | 5.505 | 12 | 6 | 3 | 1.1 | -0.6 | 10.87 |

FIG.7

| DOPANT | K [W$^{-1}$[mol%]$^{-1}$] |
|---|---|
| $Al_2O_3$ | $0.05 \times 10^{-9}$ |
| $GeO_2$ | $0.12 \times 10^{-9}$ |
| $Er_2O_3$ | $9.0 \times 10^{-9}$ |

FIG.9

OPTICAL FIBER

BACKGROUND OF THE INVENTION

1. Field of the Invention

The present invention relates to an optical fiber capable of suppressing the stimulated Brillouin scattering.

2. Description of the Related Art

To realize a high-capacity optical communication, communication techniques such as the wavelength division multiplexing (WDM) and the time division multiplexing (TDM) are employed. In such communication techniques, as the intensity of an incident light input to an optical fiber used as a transmission line increases in the optical fiber, nonlinear optical effects increases in the optical fiber. The stimulated Brillouin scattering (SBS), one of the nonlinear optical effects, is a phenomenon that a part of the incident light is scattered backward and that the scattered light, i.e. the Brillouin-scattered light, stimulates further scattering. The SBS is caused by an interaction between the light and an acoustic wave in the optical fiber. The SBS is unfavorable because it disturbs light propagation in the optical fiber. The SBS occurs when the intensity of the incident light exceeds a predetermined threshold (hereinafter, "SBS threshold"), and therefore an optical fiber having a high SBS threshold is highly desired.

The SBS is also unfavorable for an optical fiber device used for optical signal control based on the nonlinear optical effects. Such an optical fiber device uses a highly nonlinear fiber having optical nonlinearity about five times higher than that of a typical optical fiber. The highly nonlinear fiber is realized by doping a large amount of $GeO_2$ into a core of a silica-based optical fiber and decreasing an effective area of the core to increase confinement of the light.

The nonlinear optical effects employed in the highly nonlinear fiber include the self-phase modulation (SPM), the cross-phase modulation (XPM), and the four-wave mixing (FWM), which sometimes involve unwanted SBS. The SBS sometimes occurs with an intensity lower than the intensity with which the desired nonlinear optical effect occurs, and therefore a negative effect occurs in performing the optical signal control. Therefore, the highly nonlinear fiber also requires a high SBS threshold.

To increase the SBS threshold, there are conventionally suggested methods of varying optical properties, such as the wavelength dispersion and the transmission loss, in the longitudinal direction of the optical fiber by changing the core diameter and/or an amount of a dopant doped into the core in the longitudinal direction (see, for example, Japanese Patent No. 2584151, Japanese Patent No. 2753426, and Japanese Patent No. 3580640). In the above methods, because a shift amount of the Brillouin-scattered light (Brillouin shift amount) with respect to the incident light on the optical frequency spectra varies in the longitudinal direction, such that the SBS threshold increases and the SBS is hardly generated.

However, although the SBS can be suppressed with the increased SBS threshold in such an optical fiber with the optical properties varied in the longitudinal direction, there is a drawback that the optical properties are not constant in the longitudinal direction. Particularly, a pulse shape of an optical pulse can be distorted when the optical pulse input to the optical fiber passes a portion of the fiber where the optical properties are locally changed. Furthermore, though the optical properties need to be more precisely adjusted as the signal transmission rate increases, if the optical properties of the optical fiber vary in the longitudinal direction, the optical signal can be degraded like the optical pulse. Moreover, because efficiency of the nonlinear optical effects in the highly nonlinear fiber is affected by the local wavelength-dispersion properties, the efficiency can be decreased if the optical properties of the optical fiber vary in the longitudinal direction.

SUMMARY OF THE INVENTION

It is an object of the present invention to at least partially solve the problems in the conventional technology.

According to an aspect of the present invention, there is provided an optical fiber made of silica-based material. The optical fiber includes a core formed at a center of the optical fiber; and a cladding formed around the core. The core is doped with germanium dioxide, which increases refractive index and decreases acoustic-wave velocity, and aluminum oxide, which increases both refractive index and acoustic-wave velocity, satisfying $$-2.814+0.594 \times W_1 \leq W_1 \leq 54.100+0.218 \times W_1,$$

$$W_1+W_2 \leq 60, \text{ and}$$

$$W_2 \geq 56.63-2.04 \times W_1$$

where $W_1$ is doping amount of germanium dioxide in weight percentage, which is larger than 4.74, and $W_2$ is doping amount of aluminum oxide in weight percentage. A nonlinear coefficient of the optical fiber is equal to or larger than $2.6 \times 10^{-9} W^{-1}$.

Furthermore, according to another aspect of the present invention, there is provided an optical fiber made of silica-based material. The optical fiber includes a core formed at a center of the optical fiber; and a cladding formed around the core. The cladding includes an inner layer doped with fluorine, and an outer layer formed around the inner layer. The core is doped with germanium dioxide, which increases refractive index and decreases acoustic-wave velocity, and aluminum oxide, which increases both refractive index and acoustic-wave velocity, satisfying $$0 \leq -2.814+0.594 \times W_1 -0.380 \times W_3 \leq W_2 \leq 54.100+ 0.218 \times W_1 - 0.29 \times W_3,$$

$$W_1+W_2 \leq 60,$$

$$W_2 \geq 56.63-2.04 \times W_1, \text{ and}$$

$$W_1 > 4.74+0.64 \times W_3$$

where $W_1$ is doping amount of germanium dioxide in weight percentage, which is larger than $4.74+0.64 \times W_3$, $W_2$ is doping amount of aluminum oxide in weight percentage, and $W_3$ is doping amount of fluorine in the inner layer in weight percentage. A nonlinear coefficient of the optical fiber is equal to or larger than $2.6 \times 10^{-9} W^{-1}$.

Moreover, according to still another aspect of the present invention, there is provided an optical fiber made of silica-based material. The optical fiber includes a core formed at a center of the optical fiber; and a cladding formed around the core. A nonlinear coefficient of the optical fiber is equal to or larger than $2.6 \times 10^{-9} W^{-1}$. The core is doped with a first dopant, which increases refractive index and decreases acoustic-wave velocity, and a second dopant, which increases both refractive index and acoustic-wave velocity.

The above and other objects, features, advantages and technical and industrial significance of this invention will be better understood by reading the following detailed descrip-

DETAILED DESCRIPTION OF THE PREFERRED EMBODIMENTS

Exemplary embodiments of the present invention are described in detail below with reference to the accompanying drawings. The present invention is not limited to the embodiments, and various modifications can be made without departing from the scope of the invention.

Figure 1:
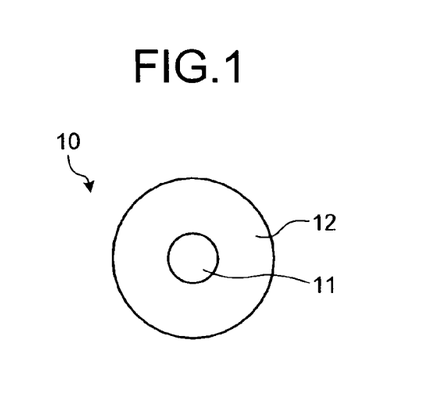
FIG. 1 is a schematic diagram of an optical fiber according to a first embodiment of the present invention.

FIG. 1 is a schematic diagram of an optical fiber 10 according to the first embodiment. The optical fiber 10 is a silica-based single-mode optical fiber that includes a core 11 and a cladding 12 formed around the core 11.

The core 11 is doped with $GeO_2$ that increases a refractive index and decreases an acoustic-wave velocity by 22 wt % and $Al_2O_3$ that increases both the refractive index and the acoustic-wave velocity by 12.66 wt %. The core diameter is 7 μm. The cladding 12 is made of pure silica glass. A doping amount $W_1$ of $GeO_2$ in wt % into the core 11 is thus larger than 4.74, and a doping amount $W_2$ of $Al_2O_3$ in wt % thus satisfies $$-2.814 + 0.594 \times W_1 \leq W_2 \leq 54.100 + 0.218 \times W_1,$$

$$W_1 + W_2 \leq 60, \text{ and}$$

$$W_2 \geq 56.63 - 2.04 \times W_1.$$

Figure 2A:
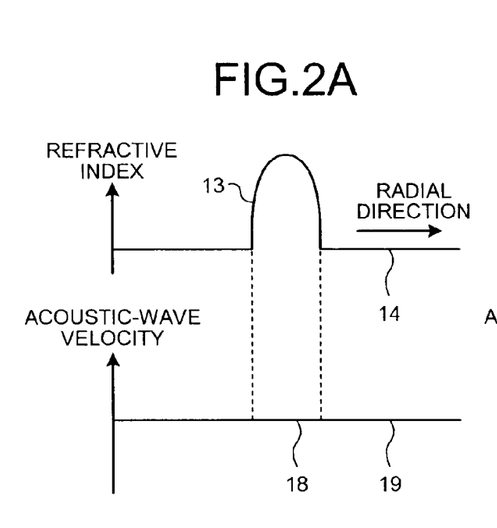
FIG. 2A is a schematic diagram for explaining a relation between a refractive index profile and an acoustic-wave velocity profile in a radial direction of the optical fiber shown in FIG. 1.
Figure 2B:
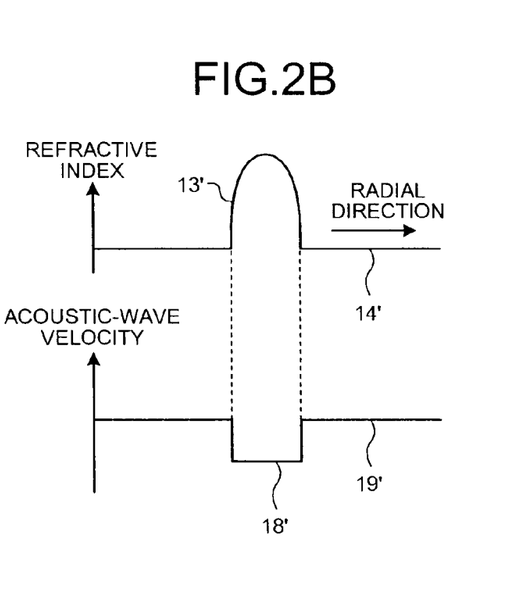
FIG. 2B is a schematic diagram for explaining a relation between the refractive index profile and the acoustic-wave velocity profile in the radial direction of a conventional optical fiber.

FIG. 2A is a schematic diagram for explaining a relation between a refractive index profile and an acoustic-wave velocity profile in a radial direction of the optical fiber 10. FIG. 2B is a schematic diagram for explaining a relation between the refractive index profile and the acoustic-wave velocity profile in the radial direction of a conventional optical fiber doped with only $GeO_2$. A refractive index profile 13 of the core 11 in the optical fiber 10 is a so-called single-peaked profile, and a refractive index profile 14 of the cladding 12 is flat in the radial direction. A relative refractive index difference Δ between the maximum refractive index of the core 11 and the refractive index of the cladding 12 is 2.80%. Such a refractive index profile contributes to a decent confinement of a light in the core 11 while it propagates through the optical fiber 10. In the conventional optical fiber, a refractive index profile 13' of the core, a refractive index profile 14' of the cladding, and a relative refractive index difference Δ are same as those of the optical fiber 10, and therefore the light is well confined to the core while it propagates through the optical fiber.

On the other hand, as for an acoustic-wave velocity profile, in the conventional optical fiber, the acoustic-wave velocity of the core is lower than that of the cladding because the core is doped with $GeO_2$ that decreases the acoustic-wave velocity. Therefore, an acoustic wave is confined to the core while it propagates through the optical fiber. On the contrary, in the optical fiber 10 according to the first embodiment, because the core 11 is doped with $GeO_2$ and $Al_2O_3$, the acoustic-wave velocity of the core 11 is virtually equal to the acoustic-wave velocity of the cladding 12. Because of such acoustic-wave velocity profiles 18 and 19 shown in FIG. 2A, the acoustic wave disperses across the core 11 and the cladding 12 while it propagates through the optical fiber 10. As a result, a spatial overlap of the light and the acoustic wave is reduced in the optical fiber 10, and therefore the stimulated Brillouin scattering (SBS) is suppressed. In this case, the Brillouin shift amount is 11.39 GHz.

The nonlinear coefficient γ is expressed by $$\gamma = n_2 / A_{\text{eff}}$$

where $n_2$ is a nonlinear refractive index and $A_{\text{eff}}$ is an effective area. The optical fiber 10 according to the first embodiment exhibits a high nonlinearity, where γ is $2.64 \times 10^{-9} W^{-1}$.

Figure 7:
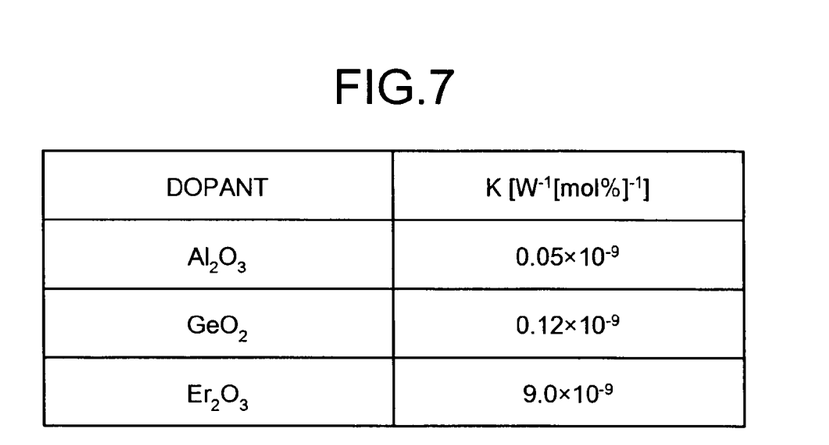
FIG. 7 is a table showing coefficient K of dopants.

The optimum concentrations of $GeO_2$ and $Al_2O_3$ that realize a desirable γ while suppressing the SBS are calculated by $$\gamma = \gamma_{(SiO2)} + K_{(Al2O3)} X_{(Al2O3)} + K_{(Er2O3)} X_{(Er2O3)} + K_{(GeO2)} X_{(GeO2)} \quad (1)$$

where $\gamma_{(SiO2)}$ is $4.26 \times 10^{-10} W^{-1}$, K is a coefficient for the corresponding dopant in $W^{-1} \text{mol} \%^{-1}$, and X is a concentration for the corresponding dopant in mol % (see, for example, Ferdinand A. Oguama, et al., "Measurement of the nonlinear coefficient of telecommunication fibers as a function of Er, Al, and Ge doping profiles by using the photorefractive beam-coupling technique" J. Opt. Soc. Am. B vol. 22, No. 8, pp. 1600-1604, August 2005). As the coefficients K for the dopants, values shown in FIG. 7 are used. According to the first embodiment, because $X_{(Er2O3)}$ is zero, there is no need of considering influence of $Er_2O_3$ on γ.

As explained above, in the optical fiber according to the first embodiment, because a large amount of $GeO_2$ is doped into the core to increase the nonlinear coefficient, the light is strongly confined to the core while it propagates through the optical fiber. Furthermore, because the core is further doped with 12.66 wt % of $Al_2O_3$ that increases both the refractive index and the acoustic-wave velocity, the acoustic wave disperses across the core and the cladding of the optical fiber while it propagates through the optical fiber, still keeping the nonlinear coefficient large. As a result, the spatial overlap of the light and the acoustic wave is reduced in the optical fiber, and therefore the SBS is suppressed. Furthermore, because of the high optical nonlinearity, the optical fiber according to the first embodiment is suitable as a highly nonlinear fiber based on the nonlinear optical effects.

Figure 3:
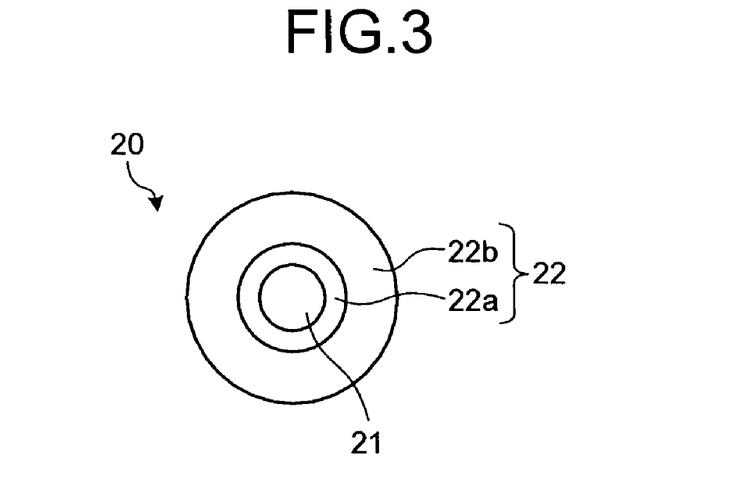
FIG. 3 is a schematic diagram of an optical fiber according to a second embodiment of the present invention.

FIG. 3 is a schematic diagram of an optical fiber 20 according to a second embodiment of the present invention. The optical fiber 20 is a silica-based single-mode optical fiber that includes a core 21 and a cladding 22 formed around the core 21. The cladding 22 further includes an inner layer 22a formed around the core 21 and doped with fluorine, and an outer layer 22b formed around the inner layer 22a.

The core 21 is doped with $GeO_2$ by 22.50 wt % and $Al_2O_3$ by 11.82 wt %. The core diameter is 7 μm. The inner layer 22a is doped with fluorine that decreases both the refractive index and the acoustic-wave velocity by 3.50 wt %, and the outer layer 22b is made of pure silica glass. The diameter of the inner layer 22a is 23 μm. The doping amount $W_1$ of $GeO_2$ in wt % into the core 21 is thus larger than 4.74+0.64×3.50, and, when a doping amount $W_3$ of fluorine into the inner layer 22a is 3.50 as described above, the doping amount $W_2$ of $Al_2O_3$ in wt % thus satisfies $-2.814+0.594 \times W_1-0.380 \times W_3 \leq W_2 \leq 54.100+0.218 \times W_1-0.290 \times W_3$, $W_1+W_2 \leq 60$, and $W_2 \geq 56.63-2.04 \times W_1$.

The nonlinear coefficient γ of the optical fiber 20 is $2.65 \times 10^{-9} W^{-1}$, which exhibits a high nonlinearity.

Figure 4:
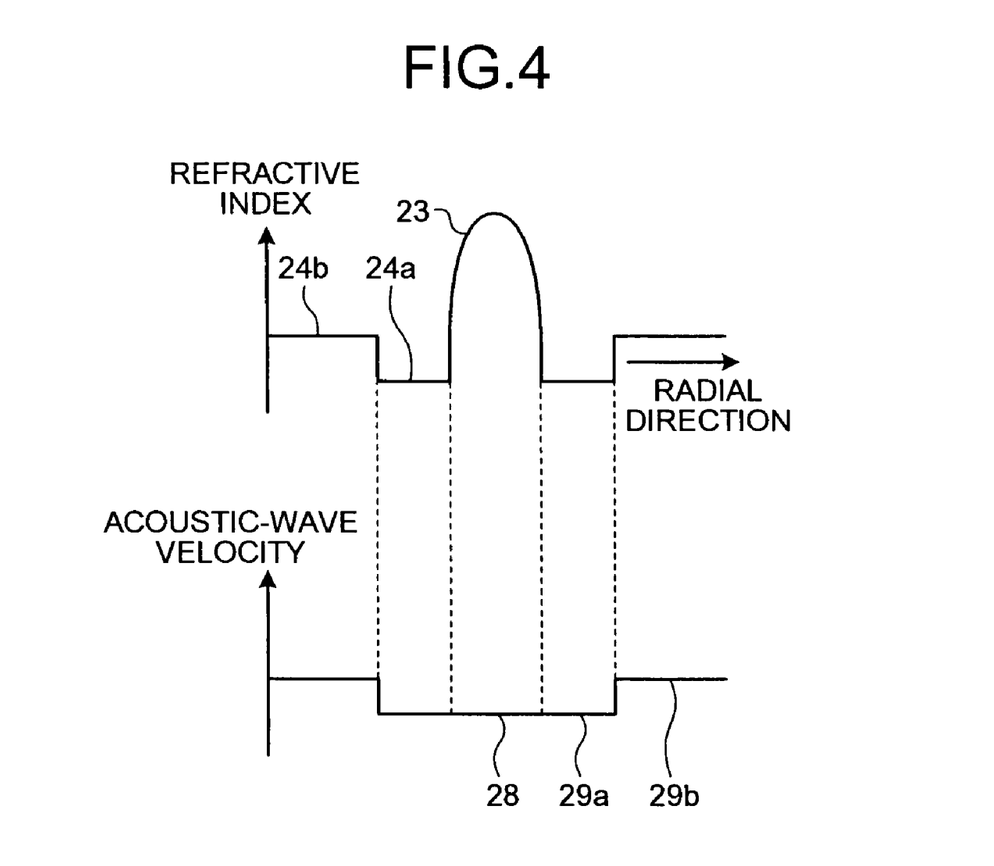
FIG. 4 is a schematic diagram for explaining a relation between the refractive index profile and the acoustic-wave velocity profile in the radial direction of the optical fiber shown in FIG. 3.

FIG. 4 is a schematic diagram for explaining a relation between the refractive index profile and the acoustic-wave velocity profile in the radial direction of the optical fiber 20. A refractive index profile 23 of the core 21 in the optical fiber 20 is the single-peaked profile, and a refractive index profile 24a of the inner layer 22a and a refractive index profile 24b of the outer layer 22b are flat in the radial direction. A relative refractive index difference Δ1 between the maximum refractive index of the core 21 and the refractive index of the outer layer 22b is 2.75%. A relative refractive index difference Δ2 between the refractive index of the inner layer 22a and the refractive index of the outer layer 22b is −0.98%. Therefore, A relative refractive index difference Δ between the maximum refractive index of the core 21 and the refractive index of the inner layer 22a is 3.73%. Such a refractive index profile contributes to a decent confinement of the light in the core 21 while it propagates through the optical fiber 20.

As for the acoustic-wave velocity profile, both an acoustic-wave velocity profile 29a of the inner layer 22a and an acoustic-wave velocity profile 29b of the outer layer 22b are flat in the radial direction; however, because the inner layer is doped with fluorine that decreases the acoustic-wave velocity, the acoustic-wave velocity of the inner layer 22a is lower than that of the outer layer 22b. On the other hand, because the core 21 is doped with $GeO_2$ that decreases the acoustic-wave velocity by 22.50 wt % and $Al_2O_3$ that increases the acoustic-wave velocity by 11.82 wt %, the acoustic-wave velocity of the core 21 is virtually equal to the acoustic-wave velocity of the inner layer 22a as indicated by a refractive index 28 of the core 21 and the refractive index 29a. Because of such an acoustic-wave velocity profile, the acoustic wave disperses across the core 21 and the inner layer 22a while it propagates through the optical fiber 20. As a result, a spatial overlap of the light and the acoustic wave is reduced in the optical fiber 20, and therefore the SBS is suppressed. In this case, the Brillouin shift amount is 11.27 GHz.

As described above, the optical fiber has a refractive index profile in which the core has the highest refractive index, so that the light is confined to the core. To make the refractive index of the core higher than the refractive index of the cladding, the core is generally doped with $GeO_2$.

As for the propagation of the acoustic wave in the optical fiber, it is known that the acoustic wave is confined to an area in which a value called an acoustic index is higher, like the refractive index for the light (see, for example, Peter D. Dragic, et al., "Optical fiber with an acoustic guiding layer for Stimulated Brillouin Scattering suppression", CLEO 2005, CThZ3). The acoustic index depends on characteristics of the material, like the refractive index. The acoustic index is inversely proportional to a propagation velocity of the acoustic wave, i.e., the acoustic-wave velocity.

Figure 5:
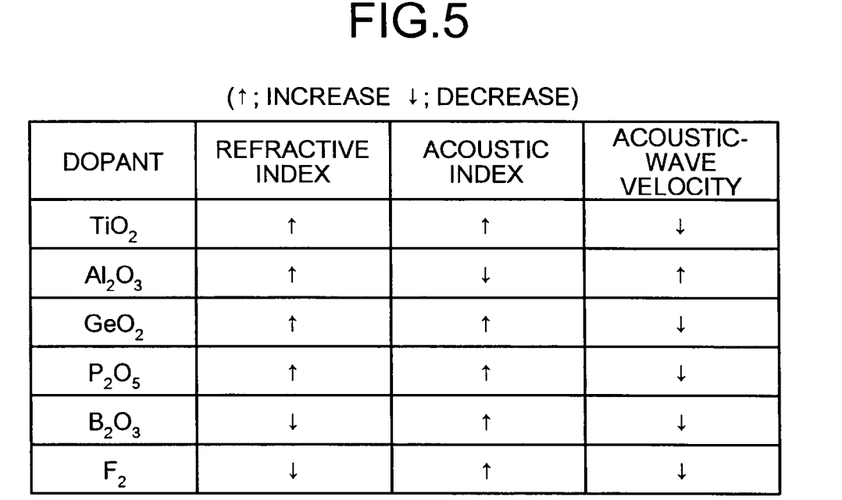
FIG. 5 is a table showing changes of refractive index, acoustic index, and acoustic-wave velocity of a silica-based optical fiber when various dopants are doped.

FIG. 5 is a table showing changes of the refractive index, the acoustic index, and the acoustic-wave velocity of a silica-based optical fiber when various dopants are doped (see, for example, C. K. Jen, et al., "Role of guided acoustic wave properties in single-mode optical fiber design", Electron. Lett., vol. 24, pp. 1419-1420, 1988). In the table, an up-pointing arrow indicates increase of the parameter and a down-pointing arrow indicates decrease of the parameter. As shown in FIG. 5, $GeO_2$ increases the refractive index and the acoustic index, and decreases the acoustic-wave velocity. Therefore, when $GeO_2$ is doped into the core, both the light and the acoustic wave are confined to the core. So that the acoustic wave is not confined to the core while the light is confined to the core, the core should be doped with a dopant that makes the acoustic index of the core relatively lower the acoustic-wave velocity relatively higher than those of the cladding, while the refractive index of the core is retained high.

As shown in FIG. 5, $Al_2O_3$ increases both the refractive index and the acoustic-wave velocity, and decreases the acoustic index. In other words, by doping $Al_2O_3$ into the core, the light is confined to the core, but the acoustic wave is not confined to the core. As a result, the spatial overlap of the light and the acoustic wave is reduced in the optical fiber, and therefore the intensity of the Brillouin-scattered light is decreased, which suppresses the SBS.

A relation between particular doping amounts of $Al_2O_3$ and the acoustic-wave velocity is explained below. According to disclosure in Y. Koyamada, et al., "Simulating and designing Brillouin gain spectrum in single-mode fibers", J. Lightwave Technol., vol. 22, pp. 631-639, 2004 and Y. Y. Huang, et al., "Relationship between composition, density and refractive index for Germania silica glasses", J. Non-Cryst. Solids, vol. 27, pp. 29-37, 1978, the relations between the doping amounts of $GeO_2$ and F and the acoustic-wave velocity are expressed by $$V_L = 5944(1-7.2 \times 10^{-3} M_1 - 2.7 \times 10^{-3} W_3) \qquad (2)$$

$$V_S = 3749(1-6.4 \times 10^{-3} M_1 - 2.7 \times 10^{-3} W_3) \qquad (3)$$

where $V_L$ is longitudinal-mode acoustic wave velocity in m/sec, $V_S$ is velocity of a lateral-mode acoustic wave in m/sec, $M_1$ is a doping amount of $GeO_2$ in mol %, and $W_3$ is a doping amount of F in wt %. The longitudinal-mode acoustic wave propagates in the longitudinal direction of the optical fiber, and the lateral-mode acoustic wave propagates in the radial direction of the optical fiber. The Brillouin scattering is caused mainly by an interaction of the light and the longitudinal-mode acoustic wave.

However, a relation between the doping amount of $Al_2O_3$ and the acoustic-wave velocity has not been known. Therefore, the inventor of the present invention carefully examined properties of the Brillouin scattering in an optical fiber doped with $Al_2O_3$, searching for the relation between the doping amount of $Al_2O_3$ and the acoustic-wave velocity.

Figure 6:
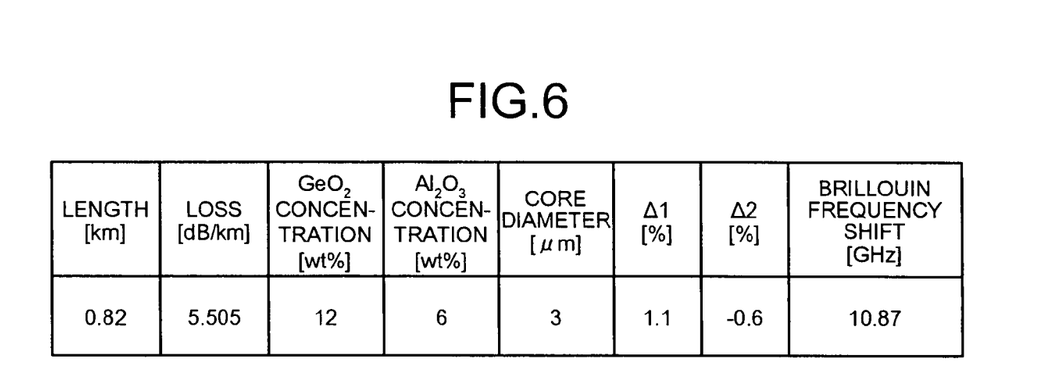
FIG. 6 is a table of properties of a sample fiber.

The procedure of the examination is explained below. An optical fiber with the properties shown in FIG. 6 (hereinafter, "sample fiber") is used. The sample fiber is doped with $GeO_2$ and $Al_2O_3$ into the core, and fluorine into the whole cladding. In FIG. 6, Δ1 indicates the relative refractive index difference between the maximum refractive index of the core and the pure silica glass, and Δ2 indicates the relative refractive index difference between the cladding and the pure silica glass.

Expression (4) expresses the relation among the doping amount of $GeO_2$, the doping amount of $Al_2O_3$, and the refractive index. A refractive index n of the core of the sample fiber to a light at a wavelength of 1.55 µm is obtained by $$n=1.444(1.00+1.01\times10^{-3}M_1+1.50\times10^{-3}M_2) \quad (4)$$

where $M_2$ is a doping amount of $Al_2O_3$ in mol %.

The Brillouin shift amount $v_B$ is then obtained by measuring a spectrum of a Brillouin-scattered light generated by the SBS when a light at the wavelength λ of 1.55 µm and an intensity of 13.25 dBm is input to the sample fiber.

Based on the refractive index n of the core of the sample fiber and the Brillouin shift amount $v_B$ obtained above, velocity $V_L$ of the longitudinal-mode acoustic wave in the core of the sample fiber in m/sec is calculated using $$v_B=2nV_L/\lambda. \quad (5)$$

Because the calculated velocity $V_L$ includes effects by both $GeO_2$ and $Al_2O_3$, it is assumed that Expression (6) is established to calculate the velocity $V_L$, where β is a proportionality coefficient indicative of contribution of the doping amount of $Al_2O_3$ to the velocity of the longitudinal acoustic wave.

$$V_L=5944(1-7.2\times10^{-3}M_1+\beta M_2) \quad (6)$$

By assigning values of $V_L$, the doping amount of $GeO_2$, and the doping amount of $Al_2O_3$ to Expression (6), β is obtained as $1.22\times10^{-2}$. As a result, the inventor found that the velocity $V_L$ of the longitudinal-mode acoustic wave in the core doped with $GeO_2$ and $Al_2O_3$ is expressed by $$V_L=5944(1.00-7.20\times10^{-3}M_1+1.22\times10^{-2}M_2) \quad (7)$$

Given below is an explanation of a relation between the velocities of longitudinal-mode acoustic waves in the core and the cladding of an optical fiber with a high SBS threshold, in which the SBS hardly occurs even when a light with high intensity is input, i.e., an optical fiber that suppresses the SBS. The SBS properties of the optical fiber are generally explained by the spectrum of a Brillouin-scattered light. When a plurality of the longitudinal-mode acoustic waves is present in the optical fiber, the spectrum includes peaks that correspond to the longitudinal frequencies of the acoustic waves. A Brillouin gain at the frequency of the highest peak in the spectrum dominates behaviors of the SBS. The Brillouin gain is a gain obtained when a Brillouin-scattered light stimulates further scattering.

The maximum peak value of the Brillouin gain in an optical fiber having a core with 4-µm diameter and the relative refractive index difference of 3% between the core and a cladding is calculated with varied differences between the velocities of the longitudinal acoustic waves in the core and the cladding. A result of the calculation shows that there is a value of the acoustic-wave velocity difference, which minimizes the maximum peak value of the Brillouin gain. Therefore, if the acoustic-wave velocity difference is close to the value, the maximum peak value of the Brillouin gain can be virtually minimized by the longitudinal acoustic wave sufficiently dispersing into the cladding, and the SBS can be efficiently suppressed. More particularly, the SBS is efficiently suppressed under the condition that satisfies $$-0.02 \leq \Delta V_L=(V_{Lcore}-V_{Lclad})/V_{L0} \leq 0.50 \quad (8)$$

where $V_{Lcore}$ is velocity of the longitudinal-mode acoustic wave in the core, $V_{Lclad}$ is velocity of the longitudinal-mode acoustic wave in the cladding, and $V_{L0}$ is 5944 m/s.

If $\Delta V_L$ is equal to or lower than 0.50 as specified by Expression (8), the longitudinal-mode acoustic wave sufficiently disperses into the cladding, and the SBS gain becomes sufficiently low. On the other hand, if $\Delta V_L$ is equal to or higher than −0.02, the longitudinal-mode acoustic wave still sufficiently disperses into the cladding, and the lateral-mode acoustic wave that causes a negative effect on the light is hardly generated.

Explained below is how to realize the condition that satisfies Expression (8) using an optical fiber doped with $GeO_2$ and $Al_2O_3$ into the core. When the cladding is made of pure silica glass, $V_{Lclad}$ is 5944 m/s.

With a conversion of the units of the doping amounts of $GeO_2$ and $Al_2O_3$ in $SiO_2$ glass from mol % to wt %, the following expressions are established.

$$M_1=(W_1/104.6)/\{(100-W_1-W_2)/60.1+W_1/104.6+W_2/102.0\}\times100 \quad (9)$$

$$M_2=(W_2/102.0)/\{(100-W_1-W_2)/60.1+W_1/104.6+W_2/102.0\}\times100 \quad (10)$$

By substituting Expression (7) into Expression (8) and using Expressions (9) and (10), Expression (11) is obtained.

$$-2.814+0.594\times W_1 \leq W_2 \leq 54.100+0.218\times W_1 \quad (11)$$

Because $W_2$ is larger than zero, $-2.814+0.594\times W_1$ is also larger than zero. Therefore, $W_1$ is larger than 4.74 wt % (rounded at the third decimal places).

In a case of an optical fiber doped with $GeO_2$ and $Al_2O_3$ into the core and fluorine into the cladding, because the fluorine reduces the velocity of the longitudinal-mode acoustic wave in the cladding, the condition that satisfies Expression (8) with consideration of Expression (2) is expressed by $$-2.814+0.594\times W_1-0.380\times W_3 \leq W_2 \leq 54.100+0.218\times W_1-0.290\times W_3 \quad (12)$$

Because $W_2$ is larger than zero, $-2.814+0.594\times W_1-0.380\times W_3$ is also larger than zero. Therefore, $W_1$ is larger than $4.74+0.64\times W_3$ wt %.

If the nonlinear coefficient γ is equal to or larger than $2.6\times10^{-9}W^{-1}$, based on Expressions (1), (9), and (10), the condition of the following expression is obtained.

$$W_2 \geq 56.63-2.04\times W_1 \quad (13)$$

With further consideration of a limit of the doping amount in manufacturing the optical fiber, the following condition is obtained.

$$W_1+W_2 \geq 60 \text{ wt \%} \quad (14)$$

Figure 8:
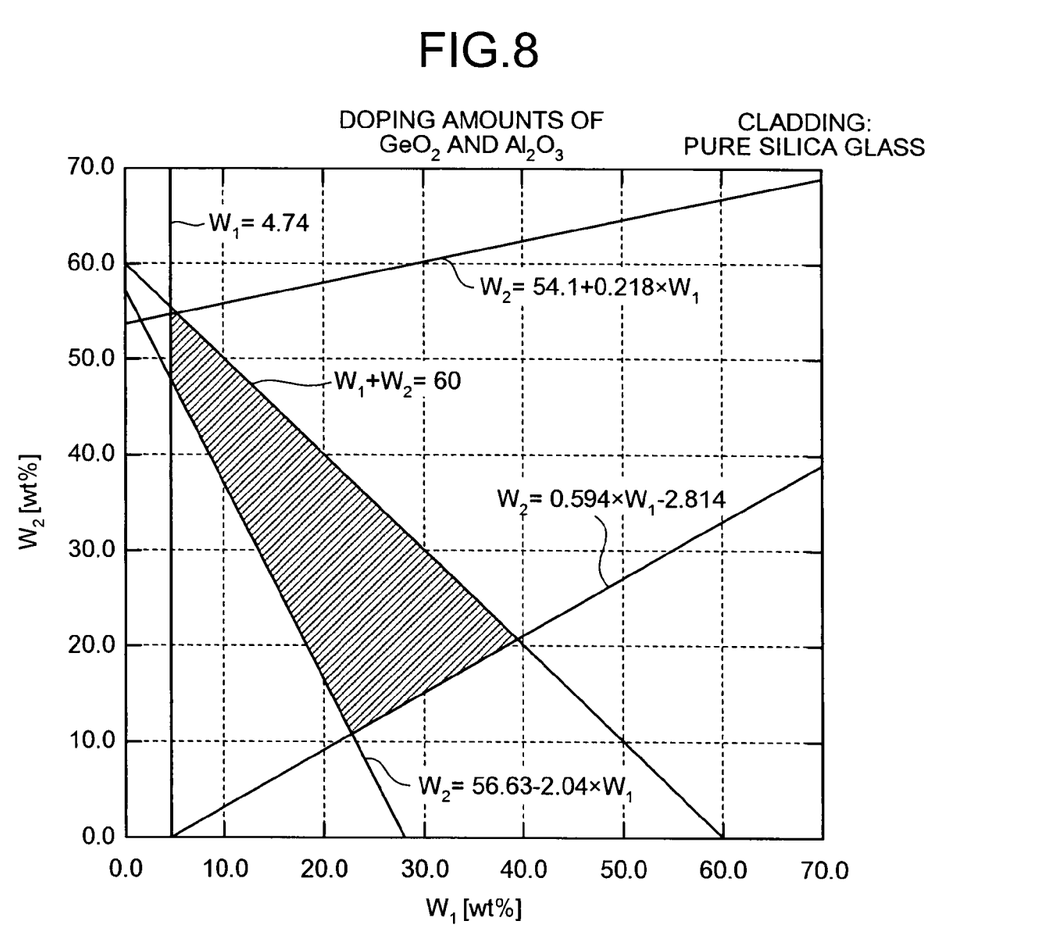
FIG. 8 is a graph showing ranges of $W_1$ and $W_2$ that satisfy Expressions (11), (13), and (14)
Figure 9:
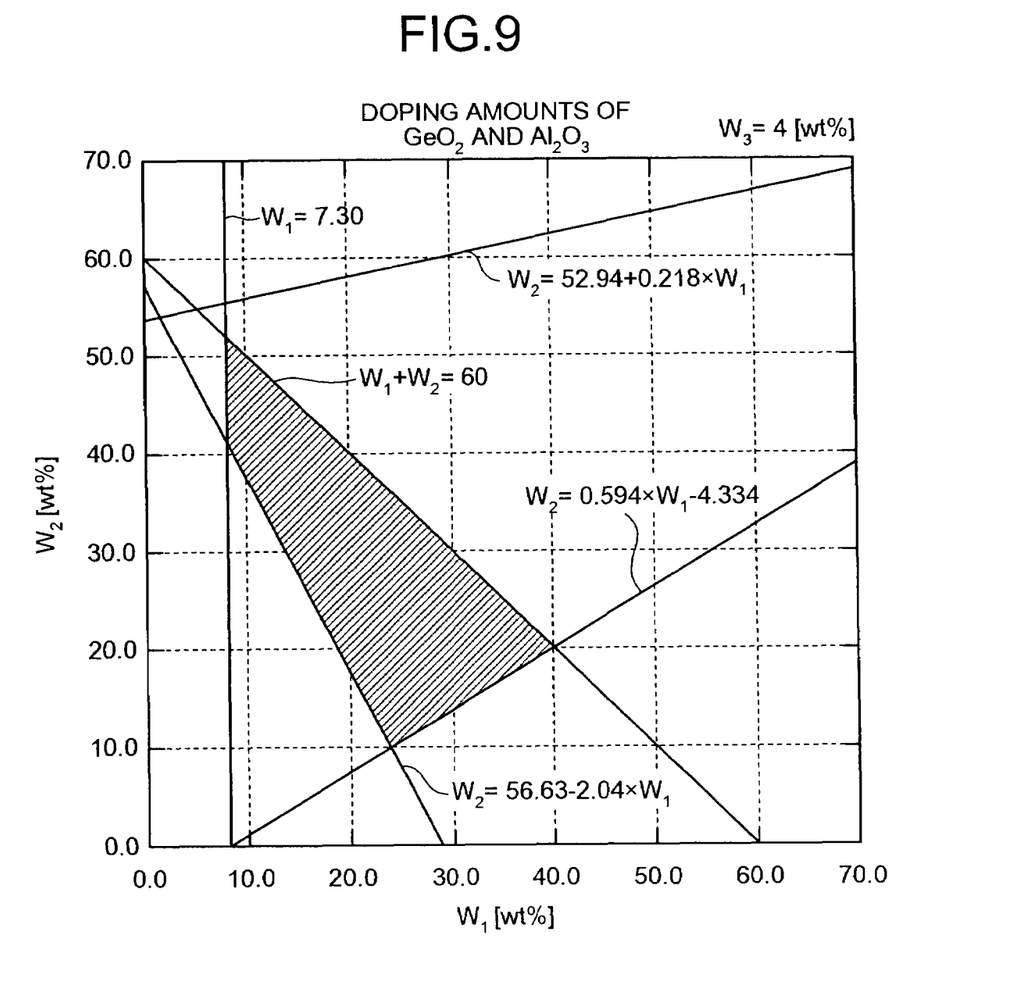
FIG. 9 is a graph showing ranges of $W_1$ and $W_2$ that satisfy Expressions (12), (13), and (14), when $W_3$ is 4 wt % and $W_1$ is equal to or larger than 7.30 wt %.

Ranges of $W_1$ and $W_2$ indicative of amounts of $GeO_2$ and $Al_2O_3$ that can be doped into the core to satisfy the conditions described above are shown in FIGS. 8 and 9. FIG. 8 is a graph showing the ranges that satisfy Expressions (11), (13), and (14) when the cladding is made of pure silica glass, and FIG. 9 is a graph showing the ranges that satisfy Expressions (12), (13), and (14) when $W_3$ is 4 wt % and $W_1$ is equal to or larger than 7.30 wt %.

As indicated by Expression (1), an optical fiber that satisfies the condition of $W_2=54.100+0.218\times W_1$ in Expression (11) has a nonlinear coefficient higher than that of an optical fiber doped with the same amount of $GeO_2$ but not doped with $Al_2O_3$. For example, if $GeO_2$ is doped by 20 wt % into a highly nonlinear fiber that satisfies the condition of $W_2=54.100+0.218\times W_1$, the nonlinear coefficient of the highly nonlinear fiber is 2.03 times higher than that of a highly nonlinear fiber not doped with $Al_2O_3$, and the highly nonlinear fiber that employs the nonlinear optical effects more efficiently is thus realized.

According to an aspect of the present invention, the core of the optical fiber is doped with the dopant that increases the refractive index and that decreases the acoustic-wave velocity and another dopant that increases both the refractive index and the acoustic-wave velocity. In this manner, the difference of the acoustic-wave velocity between the core and the cladding is remarkably decreased so that the acoustic wave disperses into the cladding during the propagation, and therefore the spatial overlap of the light and the acoustic wave is reduced in the optical fiber. As a result, an optical fiber that can suppress the SBS can be realized without varying the optical properties in the longitudinal direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber made of silica-based material, comprising:
    a core formed at a center of the optical fiber; and
    a cladding formed around the core, wherein
    the core is doped with germanium dioxide, which increases refractive index and decreases acoustic-wave velocity, and aluminum oxide, which increases both refractive index and acoustic-wave velocity, satisfying $-2.814+0.594 \times W_1 \leq W_2 \leq 54.100+0.218 \times W_1,$ $W_1+W_2 \leq 60,$ and $W_2 \geq 56.63-2.04 \times W_1$ where $W_1$ is doping amount of germanium dioxide in weight percentage, which is larger than 4.74, and $W_2$ is doping amount of aluminum oxide in weight percentage, and
    a nonlinear coefficient of the optical fiber is equal to or larger than $2.6 \times 10^{-9} W^{-1}$.

2. An optical fiber made of silica-based material, comprising:
    a core formed at a center of the optical fiber; and
    a cladding formed around the core, wherein
    the cladding includes
        an inner layer doped with fluorine, and
        an outer layer formed around the inner layer,
    the core is doped with germanium dioxide, which increases refractive index and decreases acoustic-wave velocity, and aluminum oxide, which increases both refractive index and acoustic-wave velocity, satisfying $0 \leq -2.814+0.594 \times W_1-0.380 \times W_3 \leq W_2 \leq 54.100+0.218 \times W_1-0.29 \times W_3,$ $W_1+W_2 \leq 60,$ $W_2 \geq 56.63-2.04 \times W_1,$ and $W_1 \geq 4.74+0.64 \times W_3$ where $W_1$ is doping amount of germanium dioxide in weight percentage, which is larger than $4.74+0.64 \times W_3$, $W_2$ is doping amount of aluminum oxide in weight percentage, and $W_3$ is doping amount of fluorine in the inner layer in weight percentage, and
    a nonlinear coefficient of the optical fiber is equal to or larger than $2.6 \times 10^{-9} W^{-1}$.

3. An optical fiber made of silica-based material, comprising:
    a core formed at a center of the optical fiber; and
    a cladding formed around the core, wherein
    a nonlinear coefficient of the optical fiber is equal to or larger than $2.6 \times 10^{-9} W^{-1}$,
    the core is doped with a first dopant, which increases refractive index and decreases acoustic-wave velocity, and a second dopant, which increases both refractive index and acoustic-wave velocity.

* * * * *